(12) United States Patent
Ashwood-Smith et al.

(10) Patent No.: US 7,639,631 B2
(45) Date of Patent: Dec. 29, 2009

(54) PARALLEL CONSTRAINT BASED PATH COMPUTATION USING PATH VECTOR

(75) Inventors: Peter Ashwood-Smith, Hull (CA); Darek Skalecki, Kanata (CA); Gary McKenna, Kanata (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 695 days.

(21) Appl. No.: 11/239,111

(22) Filed: Sep. 30, 2005

(65) Prior Publication Data

US 2007/0076629 A1   Apr. 5, 2007

(51) Int. Cl.
 *H04L 12/28* (2006.01)
 *G01R 31/08* (2006.01)
(52) U.S. Cl. .................. 370/254; 370/248; 370/252
(58) Field of Classification Search ............... 370/241, 370/242, 241.1, 216, 254, 252, 248–249
 See application file for complete search history.

(56) References Cited

U.S. PATENT DOCUMENTS

| | | | |
|---|---|---|---|
| 5,781,537 A * | 7/1998 | Ramaswami et al. | 370/254 |
| 6,175,870 B1 * | 1/2001 | Gawlick et al. | 709/227 |
| 6,738,354 B1 * | 5/2004 | Ashwood Smith | 370/248 |
| 6,765,877 B1 * | 7/2004 | Foschiano et al. | 370/250 |
| 6,778,535 B1 * | 8/2004 | Ash et al. | 370/395.21 |
| 7,433,320 B2 * | 10/2008 | Previdi et al. | 370/248 |
| 2002/0118647 A1 * | 8/2002 | Maeno | 370/238.1 |
| 2003/0147352 A1 * | 8/2003 | Ishibashi et al. | 370/248 |
| 2003/0179701 A1 * | 9/2003 | Saleh et al. | 370/216 |
| 2004/0246896 A1 * | 12/2004 | Hoang et al. | 370/230 |
| 2005/0259587 A1 * | 11/2005 | Wakumoto et al. | 370/248 |
| 2005/0265258 A1 * | 12/2005 | Kodialam et al. | 370/254 |

\* cited by examiner

*Primary Examiner*—Kwang B Yao
*Assistant Examiner*—Candal Elpenord
(74) *Attorney, Agent, or Firm*—Ogilvy Renault LLP

(57) ABSTRACT

Methods of computing a path through a network between a source node and a destination node. At the source node, an explore message is launched into at least one link hosted by the source node. The explore message includes a path vector containing a node identifier of the source node. At a node intermediate the source node and the destination node, the explore message is received, and each link hosted by the node that can be operably added to the path is identified. A respective node identifier of the node is added to the path vector of the explore message, which is then forwarded through each identified link. At the destination node, the respective path vector is extracted from at least one received explore message.

13 Claims, 3 Drawing Sheets

ID
PARALLEL CONSTRAINT BASED PATH COMPUTATION USING PATH VECTOR

CROSS-REFERENCE TO RELATED APPLICATIONS

This is the first application filed for the present invention.

MICROFICHE APPENDIX

Not Applicable.

TECHNICAL FIELD

The present invention relates to packet data networks, and in particular to methods for parallel constraint based path computation using path vectors in such a network.

BACKGROUND OF THE INVENTION

In modern packet data networks, traffic is routed, hop-by-hop between a source node and a destination node, using a path that is computed and allocated in advance. Typically, computation of the path is based on a set of constrains. For example, the path may require allocation of a particular minimum bandwidth, or quality of service (QOS). With this arrangement, links in the path can be rejected or allocated to the path, based on whether or not they can satisfy the defined constraints. Typical path constraints may, for example, include bandwidth, Quality of Service (QoS), and latency (i.e. message wait times).

Typically, computation of a path is based on network topology information that is gathered by each node. Such topology information is normally distributed within a network (or portion thereof) by way of Link State Advertisement (LSA) messages that are flooded by each node. Thus, each node uses received LSAs to construct a network topology database covering at least the node's nearest neighbour nodes within the network. Subsequently, when a path set-up message is received by the node, a Dijkstra algorithm can be implemented to use the topology data base to select the optimal link for the next hop in the path. The link identifier can then be added to the path set-up message, which is then forwarded through the link to the next node in the path. By this means, a path can be set up, hop-by-hop through the network.

This arrangement suffers a number of disadvantages. For example, as the size of the network grows, so too must the size of the topology database maintained by each node. For very large networks, this requirement can place a heavy burden on the node's resources, and increases the time required to search the database to find a route (i.e. select the next link) that satisfies the constraints.

An additional limitation of this approach is that it cannot readily accommodate intransitive constraints within the network. For example, consider three nodes A, B and C, connected together by pair of links A-B and B-C, as shown in FIG. 1. Conventional constraint-based routing algorithms assume that all path and network constraints are transitive. Thus, if both links A-B and B-C satisfy the path constraints, then the combined path A-B-C, formed by concatenating the two links via node B, will also satisfy the path constraints. However, in the case of intransitive constraints this assumption may not, in fact, be true.

For example, consider the case of a photonic network, in which node B is a photonic (that is, all-optical) switch. Each link A-B and B-C, taken alone, may satisfy all constraints, and may thus be usable. However, concatenating the two links together through (photonic) node B, to form path A-B-C, may exceed the permissible optical signal reach (e.g. due to dispersion), which would violate a network constraint and thus not be permitted. Another example involves the routing of traffic through node B, between link A-B and link B-C. Conventional routing protocols assume that node B (and every other node, for that matter) is able to map every input port to any output port, so that the required routing of traffic through node B is inherently possible. However, in a network that implements a form of time division multiplexing, node B may not, in fact, be able to route traffic from link A-B to link B-C. An example of this situation would be a case where links A-B and B-C support different sets of timeslots. In such a case, it may not be possible to route traffic from link A-B to link B-C, because they share no common free timeslot. This is a common problem on SONET rings, where timeslots must be unchanged during traversal of all segments on the ring.

Conventional constraint-based routing protocols can deal with intransitive constraints such as those described above, but only by compounding the size and complexity of the topology database. In particular, the topology database must be expanded to include, in addition to information on each link, information regarding each intra-node route between the links hosted by each node. For a network (or network region) having N links, this increases the size of the topology database by about $N^2$ entries. As the size of the network (i.e. number of links N) increases, the size of the topology database and volume of LSA messaging rapidly become unmanageable.

Accordingly, techniques for constraint-based routing in a large network having intransitive constraints remains highly desirable.

SUMMARY OF THE INVENTION

Accordingly, an object of the present invention is to provide methods for constraint-based routing in a large network having intransitive constraints.

Thus, an aspect of the present invention provides a method of computing a path through a network between a source node and a destination node. At the source node, an explore message is launched into at least one link hosted by the source node. The explore message includes a path vector containing a node identifier of the source node. At a node intermediate the source node and the destination node, the explore message is received, and each link hosted by the node that can be operably added to the path is identified. A respective node identifier of the node is added to the path vector of the explore message, which is then forwarded through each identified link. At the destination node, the respective path vector is extracted from at least one received explore message.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
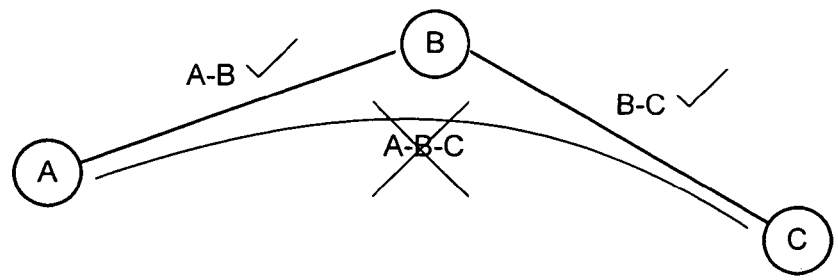
FIG. 1 schematically shows a simplified network illustrating an effect of intransitive constraints in path computation.

The present invention provides methods for constraint-based routing in a large network having intransitive constraints. Embodiments of the invention are described below, by way of example only, with reference to FIGS. 2a-3b.

In general, the present invention avoids the need for maintenance of a large topology database at each node, by replacing the conventional LSA flooding and hop-by-hop path computation behaviours with a distributed computing model. Accordingly, the topology data base maintained by each node can be restricted to information in respect of links hosted by the node itself, and intra-node connections between those links. Those of ordinary skill in the art will recognise that each node can thus populate its topology database by internal "self-discovery", and no flooding of LSA's into the network is required. Since the number of links within the topology database of the node is limited to those links that are hosted by the node, both transitive and intransitive constraints can be accommodated without unmanageably increasing the size of the topology database. Furthermore, since the need for flooding LSA's has been eliminated, network resources are no longer burdened carrying ever increasing numbers of LSA's.

In order to compute a path through the network, a source node uses its database to select links capable of satisfying at least transitive constraints of the path; generates an "explore" message containing its unique node ID as a path vector; and then forwards the explore message into the selected links. When a node receives an explore message, it uses its database to identify those links that can be added to the path (as indicated by the explore message's path vector). At a minimum, this means that the node must identify those links that can satisfy both transitive and intransitive constraints of the path. Thus, each identified link: meets path bandwidth, QoS requirements, for example; can be reached, through the node, from the link through which the explore message was received; and can be added to the path without violating any network or system constraints (such as dispersion limits). In addition, any links that lead back to a node that is already identified in the path vector are preferably excluded, which prevents explore messages from "doubling back" to a previously visited node and/or circulating endlessly within a closed loop of nodes within the network. The node then adds its unique node ID to the path vector and then forwards the explore message through each of the selected links. By this means, explore messages will propagate through the network from the source node toward the destination node.

If any paths through the network exist which satisfy all applicable constraints, then corresponding explore messages will arrive at the destination node. The respective path vector of each received explore message traces a viable path through the network. Accordingly, the destination node can examine the path vectors of and/all received explore message (e.g. received within a predetermined time period), and select the best path. This selection may, for example, be based on path length or other criteria, as desired.

Once the destination node has selected the preferred path, a corresponding path set-up message can be generated and sent back to the source node. Conveniently, the path vector of the selected path can be used to control forwarding of the path set-up message, so that it retraces the path back through the network. As a result, nodes that do not participate in the path will not receive the path set-up message.

The above-noted method will be described below with reference to FIGS. 2 and 3.

As may be seen in FIG. 2, for the purposes of example, a network of five nodes includes a source node, a destination node and three intermediate nodes A, B and C. Each of the nodes are interconnected by respective links, and intra-node routes are defined for connecting the links through each node. Each node maintains its own database which contains information detailing the availability of each link hosted by the node; and the availability of each intra-node route between the hosted links. For ease of illustration, only one database is illustrated in the figure. If desired, the availability may be indicated by a binary value (as in the figure) or by means of a link metric in a manner well known in the art.

For the purposes of the present example, it is assumed that that link AD cannot be concatenated with link SA through intermediate node A for any reason. Possible reasons for such an intransitive constraint may be an inability of node A to map traffic between links SA and AD without violating a latency requirement, or, in the case of a photonic node, photonically concatenating links SA and AD may violate a dispersion limit of the network. In any event, this constraint is reflected in the database of node A. Additionally, it is assumed that the link BD is not available for any reason, and this fact will be noted in the respective database (not shown) of node B. Note that since topology information is not shared between network nodes, for example via conventional LSA messaging, the inability of node A to map traffic between links SA and AD is not conveyed to any other nodes, and thus does not, for example, appear in node B's database. Similarly, the unavailability of link BD is not conveyed to either of nodes A or C, for example.

Figure 2A:
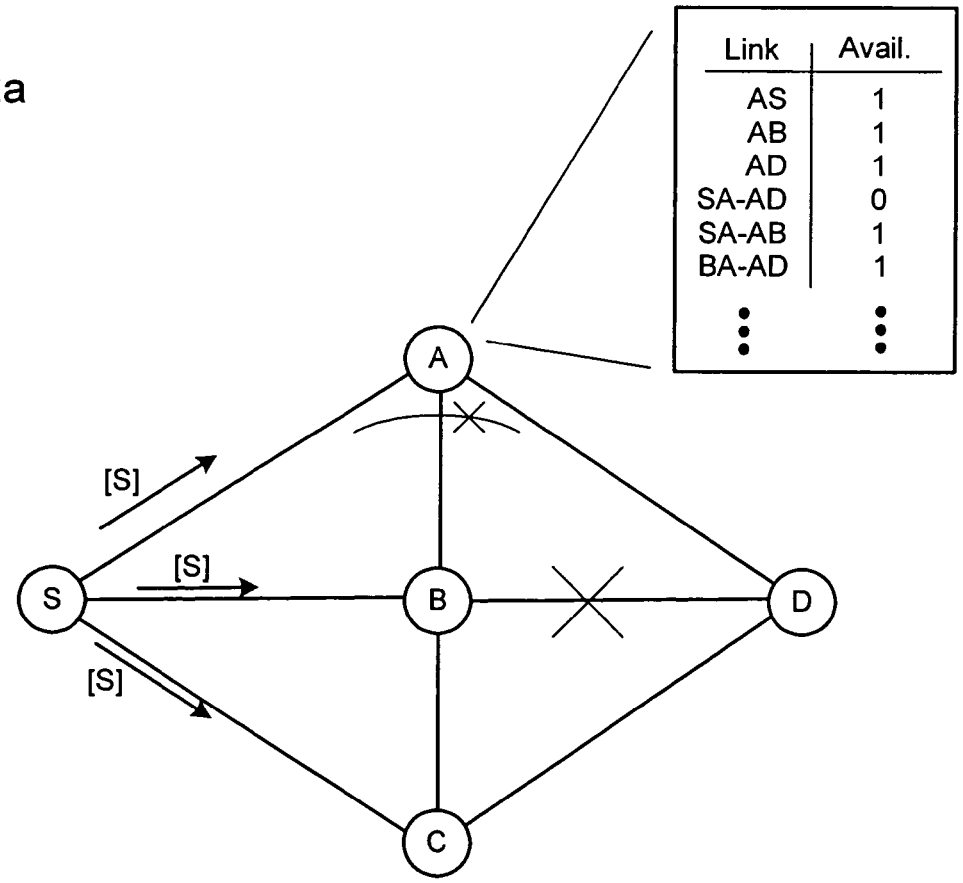
FIGS. 2a-2d schematically show a simplified network illustrating parallel path computation in accordance with an embodiment of the present invention.

As shown in FIG. 2a, the source node S generates an explore message containing its node ID as the first entry in a path vector of the message. The explore message is then flooded into every path hosted by source node S that will support the path constraints. In the illustrated example, all of paths SA, SB and SC are available, so an identical explore message is launched through each link.

Figure 2B:
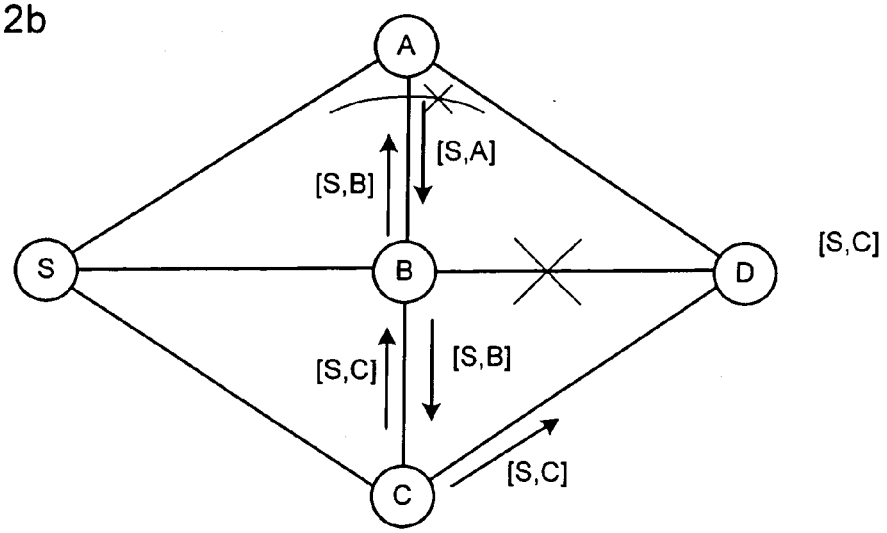

As shown in FIG. 2b, each of intermediate nodes A, B and C respond to the explore message in the same manner. In particular, each node uses its database to select those links that: satisfy the path constraints; are reachable through the node; and do not connect to a node that is already in the path vector. Thus, for example, node A receives the explore message from node S via its link SA. In response to this explore message, node A searches its database, and finds that all of links AS, AB and AD can meet the path constraints. However, link AS leads back to node S, which is already in the path vector of the explore message, and link AD cannot be reached from path SA. Only link AB satisfies all of the criteria. Accordingly, Node A adds its node ID to the path vector, and sends the explore message through link AB.

Similarly, node B receives the explore message from node S via its link SB. In response to this explore message, node B searches its database, and finds that all of links BA, BD, BC and BS can be reached from link SB. However, link BS leads back to node S, which is already in the path vector of the explore message, and link BD cannot support the path constraints. Only links BA and BC satisfy all of the criteria. Accordingly, Node B adds its node ID to the path vector, and sends the explore message through links BA and BC.

In the same manner, node C receives the explore message from node S via its link SC. In response to this explore message, node C searches its database, and finds that all of links CB, CD and CS can be reached from link SC, and each of these links can support the path constraints. However, link CS leads back to node S, which is already in the path vector of the explore message. Accordingly, Node C adds its node ID to the path vector, and sends the explore message through links CB and CD.

Figure 2C:
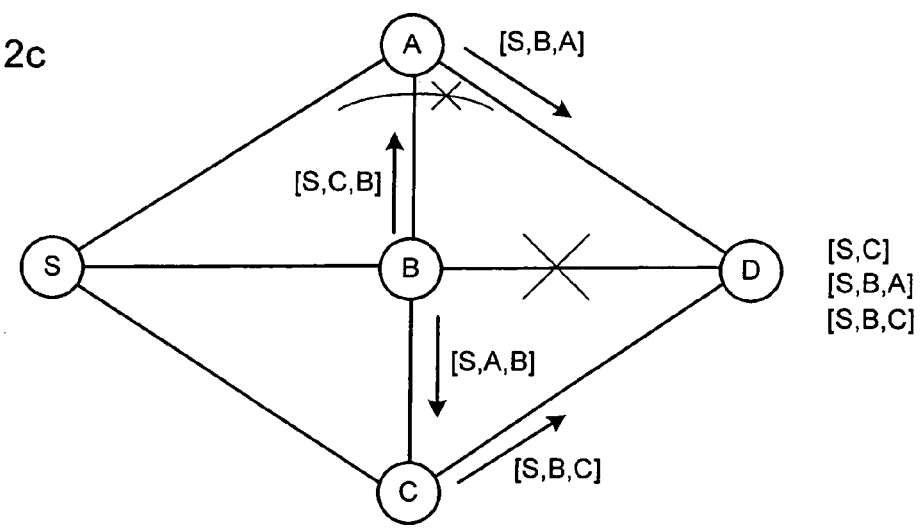

As a result of the above operations, the destination node will receive an explore message from node C, with the path vector [S,C], indicating that a viable path can be set up between the source and destination nodes via node C. If desired, the destination node can proceed with set-up of the path immediately upon receipt of this first explore message. Alternatively, it can wait (e.g. for a predetermined period of time) for any other explore messages that may arrive, and then select a preferred path from among the path vectors provided by each of the received explore messages. For example, FIGS. 2c and 2d illustrate that explore messages will continue to flow within the network, following the pattern described above, until all possible paths through the network have been explored and the corresponding explore messages either arrive at the destination node or are discarded (in the case of a non-viable path).

Figure 2D:
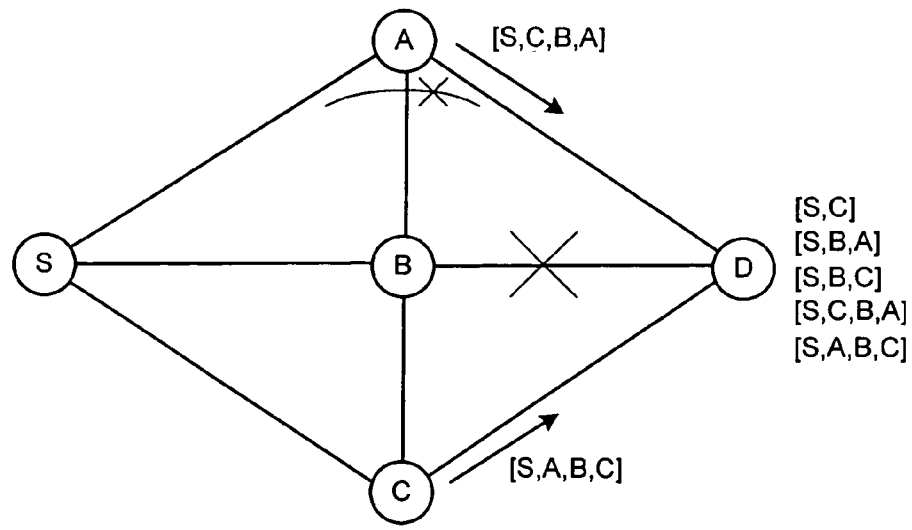

As may be seen in FIG. 2d, the result of the above process is the assembly of a listing of all viable paths through the network between the source and destination nodes. Based on this information, the destination node can select one or more desired routes, and initiate the set-up of each route. As described above, this selection may be based on the first-arriving explore message, but other criteria may be used. For example, the shortest path may be selected. Alternatively, two or more diverse paths may be selected, in which case the path vectors can be used to maximize the diversity between the paths. Other selection criteria will be readily apparent to those of ordinary skill in the art, without departing from the scope of the present invention.

Once the desired path(s) has/have been selected, the destination node can initiate setup of the path(s). Various methods may be used for this purpose. For example, the destination node may send an acknowledgement message, which contains the path vector of each selected path, back to the source node. In response to the acknowledgement message, the source node can then launch a path set-up message to trigger hop-by-hop allocation of node and link resources to the path in a generally conventional manner. The only deviation from conventional path set-up processing methods is that, in this case, the path vector can be used to control which nodes and links are allocated to the path, so that nodes that are not part of the path will not receive (and thus will not have to process) the path set-up message.

Figure 3A:
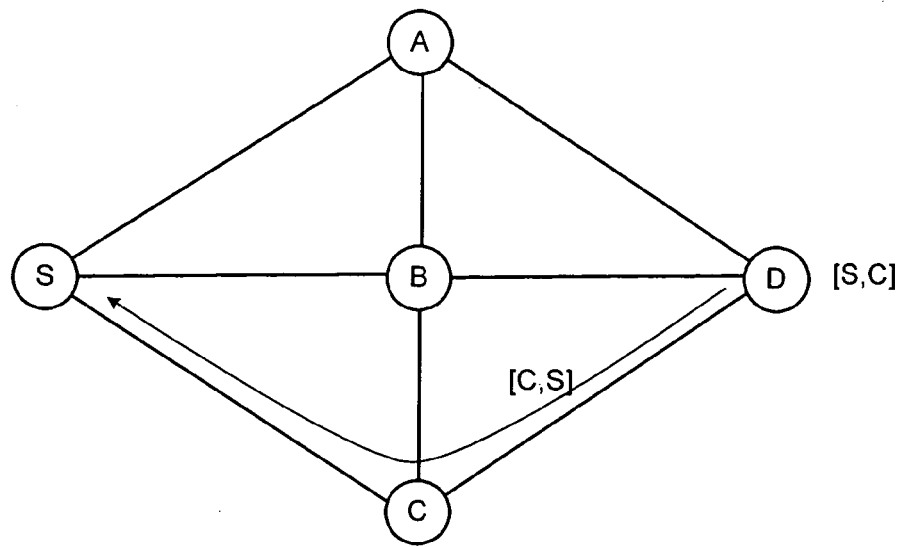
FIGS. 3a and 3b schematically illustrate path set-up using results of the parallel path computation of FIGS. 2a-2d.
Figure 3B:
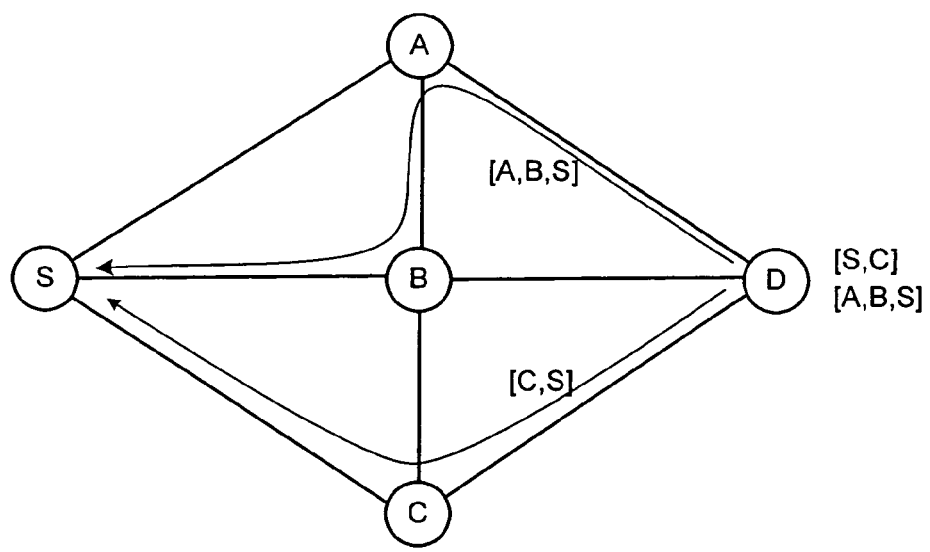

In an alternative arrangement, the destination node may simply launch the path set-up message, rather than the acknowledgement. In this case, the path set-up message follows a reverse path vector (or executes a trace-back of the path vector) so that the path is set-up between the destination node and the source node. FIGS. 3a and 3b illustrate respective examples of this path set-up scenario. In particular, FIG. 3a illustrates the route traversed by a path set-up message that retraces the path vector [S,C] accumulated by the first explore message received by the destination node (see FIG. 2b). This path vector also corresponds with a shortest path, at least in terms of the number of hops. FIG. 3b illustrates a scenario in which the path vectors of explore messages received by the destination node are used to select and set up topologically diverse paths. In this case, two paths are set up, in which the respective set-up messages retrace the path vectors [S,C] and [S,B,A].

The embodiment(s) of the invention described above is(are) intended to be exemplary only. The scope of the invention is therefore intended to be limited solely by the scope of the appended claims.

We claim:

1. A method of computing a path through a network between a source node and a destination node, the method comprising steps of:
   at the source node, selecting from among links hosted by the source node each link that satisfies at least transitive constraints of the path, and launching an explore message into each selected link hosted by the source node, the explore message including an incomplete path vector containing a node identifier of the source node; and
   at an intermediate node intermediate between the source node and the destination node, wherein the intermediate node has a database containing information detailing the availability of each link hosted by the intermediate node:
      receiving the explore message;
      identifying each link hosted by the intermediate node that is operably addable to the path;
      adding a respective node identifier of the intermediate node to the incomplete path vector of the explore message; and
      forwarding the explore message through each identified link; and
   at the destination node:
      receiving at least one explore message, thereby completing the path vector of the at least one received explore message;
      extracting the respective path vector from at least one received explore message.

2. A method as claimed in claim 1, wherein the step of identifying each link that is operably addable to the path comprises a step of identifying, from among links hosted by the intermediate node, each link that satisfies at least transitive and intransitive constraints of the path.

3. A method as claimed in claim 2, wherein the transitive constraints of the path comprise any one or more of a bandwidth and a quality of service guarantee.

4. A method as claimed in claim 2, wherein the intransitive constraints of the path comprise any one or more of:
   concatenation of the link to the path will not violate any of the predetermined path constraints; and
   the link can be reached from the link through which the explore message was received.

5. A method as claimed in claim 2, further comprising a step of excluding each link that leads to a node already identified in the path vector of the explore message.

6. A method as claimed in claim 1, wherein the step of extracting the respective path vector from at least one explore message received at the destination node comprises any one of the steps of:
   extracting the respective path vector from a first explore message received by the destination node; and
   extracting the respective path vector from each explore message received by the destination node within a predetermined period of time.

7. A method as claimed in claim 1, further comprising a step of selecting at least one of the extracted path vectors as the path.

8. A method as claimed in claim 7, wherein the step of selecting at least one of the extracted path vectors comprises any one of the steps of:
   selecting a shortest path vector; and
   selecting two or more diverse path vectors.

9. A method as claimed in claim 7, further comprising steps of:
   generating a path set-up message including a respective one of the selected path vectors; and forwarding the path set-up message through the network from the destination node to the source node using the included path vector, such that the path set-up message re-traces the included path vector.

10. In a communications network adapted for parallel computation of a path between a source node and a destination node of the network, an intermediate node comprising: means for maintaining a database which contains information detailing the availability of each link hosted by the intermediate node; means for receiving an explore message originated by the source node, the explore message including an incomplete path vector containing a respective node identifier of the source node and any other nodes traversed by the explore message between the source node and the intermediate node; means for identifying each link hosted by the intermediate node that is operably addable to the path and that satisfies at least transitive and intransitive constraints of the path; means for adding a respective node identifier of the intermediate node to the incomplete path vector of the explore message; and means for forwarding the explore message through each identified link.

11. A node as claimed in claim 10, wherein the transitive constraints of the path comprise any one or more of a bandwidth and a quality of service guarantee.

12. A node as claimed in claim 10, wherein the intransitive constraints of the path comprise any one or more of: concatenation of the link to the path will not violate any predetermined path constraints; concatenation of the link to the path will not violate any network constraints; and the link is reachable from the link through which the explore message was received.

13. A node as claimed in claim 10, further comprising means for excluding each link that leads to a node already identified in the path vector of the explore message.

* * * * *

UNITED STATES PATENT AND TRADEMARK OFFICE
CERTIFICATE OF CORRECTION

PATENT NO. : 7,639,631 B2　　　　　　　　　　　　　　　　　　　　　　　　　　Page 1 of 1
APPLICATION NO. : 11/239111
DATED : December 29, 2009
INVENTOR(S) : Ashwood-Smith et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 967 days.

Signed and Sealed this

Twenty-first Day of December, 2010

David J. Kappos
*Director of the United States Patent and Trademark Office*